United States Patent [19]

Becker et al.

[11] 4,430,773
[45] Feb. 14, 1984

[54] DEVICE FOR SIMULTANEOUS DESHIRRING, SMOOTHING AND BRAKING OF A SHIRRED TUBULAR CASING AND APPARATUS COMPRISING SAID DEVICE

[75] Inventors: Reinhold Becker; Rudolf Petry, both of Wiesbaden, Fed. Rep. of Germany

[73] Assignee: Hoechst Aktiengesellschaft, Frankfurt am Main, Fed. Rep. of Germany

[21] Appl. No.: 392,603

[22] Filed: Jun. 28, 1982

[30] Foreign Application Priority Data

Jul. 1, 1981 [DE] Fed. Rep. of Germany ....... 3125836

[51] Int. Cl.³ .............................................. A22C 11/00
[52] U.S. Cl. ........................................ 17/33; 17/1 F; 17/35; 53/576
[58] Field of Search ..................... 17/1 R, 1 F, 33, 34, 17/41, 42, 49; 53/576; 426/512, 513; 138/118.1

[56] References Cited

U.S. PATENT DOCUMENTS

| 3,751,764 | 8/1973 | Dobbert | 17/35 |
|---|---|---|---|
| 3,975,795 | 8/1976 | Kupcikevicius et al. | 17/41 |
| 4,044,425 | 8/1977 | Nausedas | 17/35 |
| 4,202,075 | 5/1980 | Michel et al. | 17/41 |

FOREIGN PATENT DOCUMENTS

| 1177029 | 8/1964 | Fed. Rep. of Germany . | |
| 2402617 | 7/1975 | Fed. Rep. of Germany . | |
| 2600275 | 7/1977 | Fed. Rep. of Germany | 53/576 |
| 2350789 | 12/1977 | France . | |

*Primary Examiner*—Willie G. Abercrombie
*Attorney, Agent, or Firm*—Schwartz, Jeffery, Schwaab, Mack, Blumenthal & Koch

[57] ABSTRACT

A device for deshirring, smoothing and braking a shirred tubular casing during stuffing of the casing with a fluid mass flowing under pressure from the stuffing horn of a stuffing machine into the tubular casing. The device comprises an annular body having a central opening releasably securable to the stuffing horn, said annular body having recesses on its outer surface extending parallel to its longitudinal axis. The recesses have a substantially U-shaped, V-shaped or rectangular cross-sectional configuration or end view configuration. The configuration of the braking and smoothing elements corresponds to that of the recesses in the surface of the annular body. The braking elements and/or the annular body are displaceable relative to each other either parallel to the longitudinal axis of the stuffing horn or the elements are displaceable perpendicular to the longitudinal axis of the stuffing horn so that the braking elements can be extended into the recesses or spaced away from the recesses. An apparatus comprising a device of the aforementioned type is also disclosed.

14 Claims, 4 Drawing Figures

DEVICE FOR SIMULTANEOUS DESHIRRING, SMOOTHING AND BRAKING OF A SHIRRED TUBULAR CASING AND APPARATUS COMPRISING SAID DEVICE

BACKGROUND OF THE INVENTION

The present invention relates to a device for deshirring, smoothing and braking a shirred tubular casing into which a fluid mass, such as a sausage mixture, flows under pressure from the stuffing horn of a stuffing machine. The invention also relates to an apparatus comprising such a device.

It is known to use shirred, tubular casings of synthetic, semi-synthetic or natural materials for packing fluid foodstuffs, such as meat products in the form of sausages. These casings, which are known in the trade as "sticks" or "hollow rod" are produced by gathering and longitudinally compressing long casings, whereby the length of the shirred casing is usually reduced to only one to three percent of the original length. In general, a shirred tubular casing which has been closed at one end is initially placed on the stuffing horn of a sausage stuffing machine in order to be filled with the sausage mixture. The sausage mixture is then forced under pressure through the stuffing horn into the casing, which is thereby continuously deshirred. After a predetermined length has been reached, cylindrical sausages are closed and tied off.

For various reasons, the diameter of the sausages which are produced should remain constant over their entire length. Only a uniform diameter, the size of which depends on the casing material, for example, assures that the stuffing operation will proceed in an optimum manner. Also, if the sausage casing is overfilled, there is a danger it may burst, while if the sausage casing is underfilled, it will have a wrinkled surface.

Various devices have heretofore been proposed for stuffing a sausage mixture into a shirred tubular casing in which special arrangements for deshirring, smoothing and braking are provided to achieve the most uniform diameter possible for the stuffed casing.

Thus, U.S. Pat. No. 4,202,075 describes a device for deshirring, smoothing and braking a shirred tubular casing which comprises an annular body of flexible material which spreads or stretches the tubular casing. On the outer surface of the annular body there are raised portions or recesses which can be extended by means of a second calibrating piece located in the interior of the annular body so that the circumference of the annular body is then enlarged. During the stuffing operation, the inner surface of the tubular casing slides over the outer surface of the annular body and is spread and expanded until it is deshirred and smoothed. The friction between the outer surface of the annular body and the inner surface of the tubular casing increases as the circumference of the annular body expands. By means of this friction, the withdrawal of the tubular casing during the stuffing operation is braked. However, the braking effect of the annular body generally remains small because of the limited expansibility of the annular body. Therefore, an additional braking element is required adjacent the stuffing horn outlet which presses the tubular casing which has been deshirred and smoothed by the annular body against the outer surface of the stuffing horn.

SUMMARY OF THE INVENTION

Accordingly, it is an object of the present invention to provide an improved device for deshirring and smoothing a shirred tubular casing.

Another object of the present invention is to provide a device for deshirring, smoothing and simultaneously braking or restraining the movement of a shirred tubular casing during a stuffing operation.

A further object of the present invention is to provide a device for effecting a trouble-free conversion of a shirred tubular casing into a creaseless, defect-free state.

It is also an object of the present invention to provide a device for deshirring, smoothing and simultaneously braking a shirred tubular casing which avoids the danger that the casing may be damaged by the deshirring device or brake element.

An additional object of the present invention is to provide a device for deshirring, smoothing and simultaneously braking a shirred tubular casing which enables jerk-free withdrawal of the casing during a stuffing operation.

A still further object of the present invention is to provide a device for deshirring, smoothing and simultaneously braking a shirred tubular casing which reduces the danger of tearing the casing.

Yet another object of the present invention is to provide an apparatus for stuffing a tubular casing with a fluid mass which comprises a device for deshirring, smoothing and simultaneously braking a shirred tubular casing meeting the aforesaid objects.

There and other objects of the invention are achieved by providing a device for deshirring, smoothing and braking a shirred tubular casing into which a fluid mass flows under pressure from a stuffing horn of a stuffing machine, said device comprising an annular body having a central opening releasably securable to a stuffing horn, said annular body having recesses on its outer surface extending parallel to its longitudinal axis, said device further comprising elements for smoothing and braking the tubular casing, said elements having a configuration substantially corresponding to the configuration of said recesses, said elements and said annular body being displaceable relative to each other such that said elements may be moved between a position in which said elements are spaced from said recesses and a position in which said elements are at least partially extended into said recesses.

The objects of the invention are further achieved by providing apparatus for stuffing a fluid mass into a shirred tubular casing which is deshirred prior to stuffing, said apparatus comprising a stuffing horn of a stuffing machine having an outlet through which a fluid mass flows under pressure, a shirred tubular casing disposed around the outer surface of the stuffing horn and having an unshirred portion with a prescribed inner diameter, an annular body with a central opening releasably secured to the outer surface of the stuffing horn adjacent the stuffing horn outlet and having recesses extending in the direction of movement of the tubular casing on its outer surface, the inner surface of the unshirred portion of the tubular casing lying directly adjacent the outer surface of said annular body at least in the regions adjacent the recesses, the outer diameter of said annular body being smaller than the inner diameter of the unshirred portion of the tubular casing, said apparatus further comprising elements for smoothing and braking the tubular casing having a configuration substantially corresponding to the configuration of the recesses, said elements lying immediately adjacent the outer surface of the unshirred portion of the tubular casing and pressing the tubular casing into said recesses, said elements and said annular body being displaceable relative to each other such that said elements may be moved between a position in which the elements are spaced from said recesses and a position in which said elements are at least partially extended into said recesses.

In preferred aspects of the invention, the braking and smoothing elements are rod-shaped and are provided at one end oriented opposite to the direction of movement of the tubular casing with a beveled or sloping surface facing the stuffing horn; the other end of said braking and smoothing elements being fastened to a plate arranged adjacent the stuffing horn outlet perpendicular to the longitudinal axis of the stuffing horn, said plate being displaceable parallel to the longitudinal axis of the stuffing horn; the recesses in the annular body having surfaces at the deepest point of the recess which slope outwardly in a direction opposite to the direction of movement of the tubular casing. The outer periphery of the annular body may have a substantially circular cross-sectional configuration with recesses or the annular body may have a substantially polygonal cross-sectional form with the recesses located at the corners of the polygon.

A substantial advantage of the device and of the apparatus of the invention is that the tubular casing is pressed from the outside against the recessed annular body inside of the tubular casing while the casing is simultaneously deshirred and smoothed. The braking action is thereby achieved with an annular body having a fixed position as a result of the adjustable pressure of the smoothing and braking elements against the outer surface of the tubular casing. Variations of the pressure with which the smoothing and braking elements press the tubular casing against the annular body, and consequently variations in the braking effect, can be controlled during the stuffing operation in that the smoothing and braking elements and/or the annular body are displaced relative to each other. In one embodiment of the invention, one or both may be displaced longitudinally, i.e. parallel to the stuffing horn. In a further embodiment of the invention, the smoothing and braking elements are pressed into the recesses in the annular body perpendicular to the longitudinal axis of the stuffing horn. Increases in the braking action retard the withdrawal of the tubular casing during the stuffing operation and increase the filled diameter of the stuffed tubular casing.

BRIEF DESCRIPTION OF THE DRAWINGS

The invention will be described in further detail with reference to the accompanying drawings, wherein.

In the drawings, like reference numerals have been used to designate like parts throughout.

DETAILED DESCRIPTION OF PREFERRED EMBODIMENTS

Figure 1:
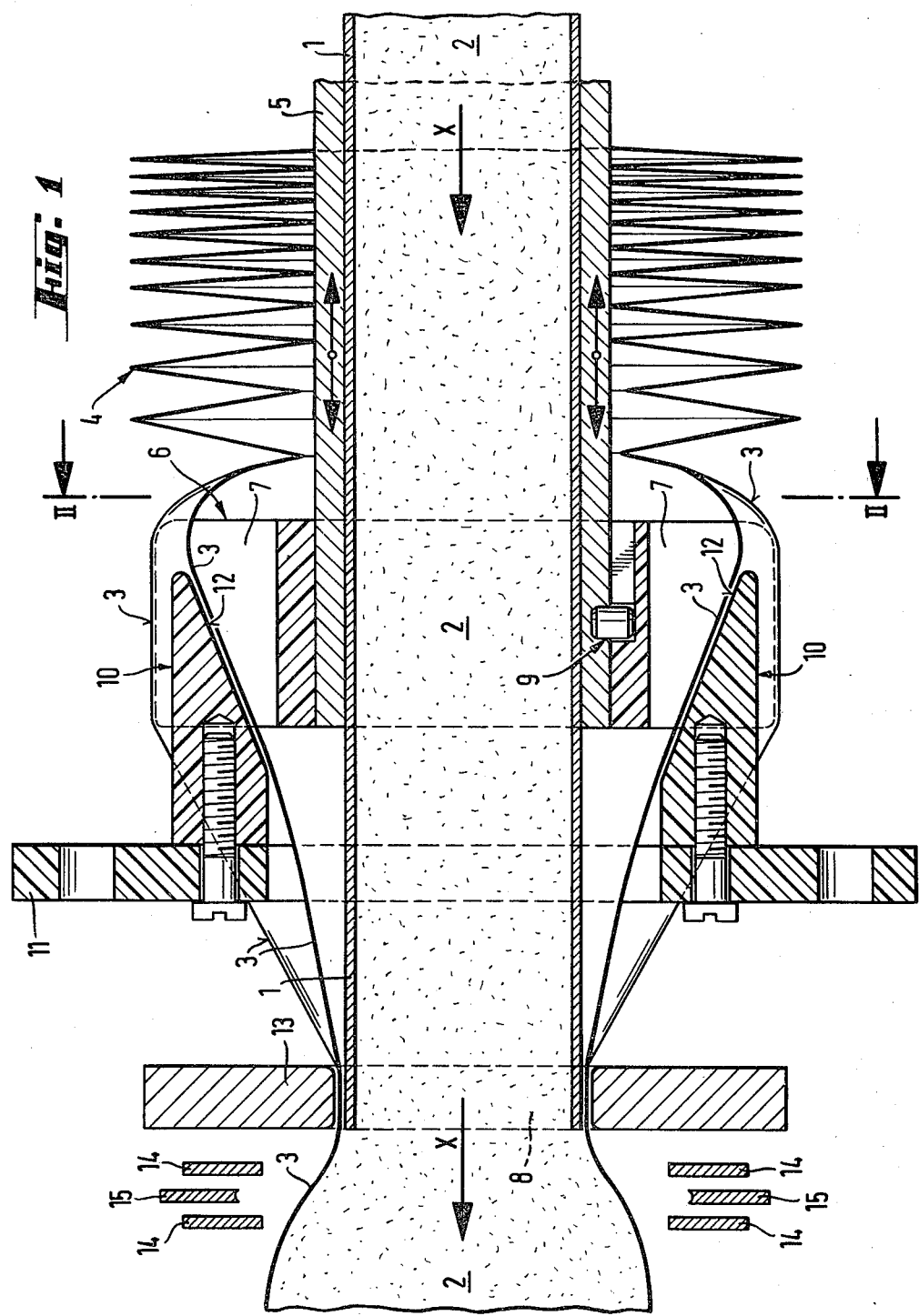
FIG. 1 is a longitudinal sectional view of an apparatus equipped with the device of the invention taken along line I—I of FIG. 2.

The tubular casing may be formed of a material customarily used to produce sausage casings such as cellulose hydrate, collagen or synthetic intestines, for example of polyamide or polyester. Optionally, the tubular casing may be fiber reinforced, particularly with a paper insert. The casing may optionally have a customary coating on its outer and/or inner surface, for example of a water vapor- and oxygen-impermeable material, which may, for example, be anchored to the surface of the tube with a conventional adhesion-promoting substance. When a casing of cellulose hydrate is utilized, it may have a customary water content of, for example, 6 to 15 percent. Alternatively, the casing might also have a very high water content, for example, up to 35 percent, so that it does not need to be soaked prior to stuffing. Cellulose hydrate casings are usually produced by coagulation of viscose and regeneration of the cellulose and contain softeners such as glycerin.

The tubular casing is drawn off the stuffing horn by the fluid material which is pressed out of the stuffing horn into the interior of the casing, whereby the casing is deshirred. The inner surface of the casing thereby slides over the outer surface of the annular body. The casing is pressed into the recesses on the outer surface of the annular body by the braking and smoothing elements which engage the outer surface of the casing. It is not necessary that the casing come in contact with the outer surface of the annular body in the regions of the recesses. However, it is also possible to press the casing all the way to the bottom of the recesses, whereby a strengthened braking action can be achieved.

The annular body may have a cylindrical form, i.e. it may have a circular periphery with recesses, or it may have the form of a block with a polygonal cross-sectional configuration in which the corners are replaced by the recesses. The polygon may have, for example, three to eight corners, especially four corners, whereby a body having a cross-shaped cross-sectional configuration is formed by the recesses. In the last mentioned embodiment of the annular body, there are flat surfaces on the outer periphery between adjacent recesses. The annular body has a central opening so that it may be placed on and releasably secured to the stuffing horn of a conventional stuffing machine adjacent the stuffing horn outlet. The central opening thus is substantially cylindrical and has a diameter which substantially corresponds to the outer diameter of the stuffing horn. Preferably, and annular body is not secured directly to the stuffing horn, but instead is attached to an outer tube displaceably mounted around the stuffing horn. The stuffing machine serves, for example, to fill tubular casings with a sausage mixture. The releasable attachment of the annular body or the outer tube to the stuffing horn as well as the releasable attachment of the annular body to the outer tube may be effected, for example, by means of threads, by means of a bayonet connector, or by means of a snap lock which makes use of breakaway elements as disclosed in U.S. Pat. No. 4,034,441, of elastic crosspieces or of a securing ring according to German Industrial Standard (DIN) 471/472 in or adjacent the central opening of the annular body which engage a groove, notch or ridge on the stuffing horn.

The annular body and the smoothing and braking elements are advantageously relatively rigid and practically inflexible and usually are made of metal or synthetic resin.

The recesses in the outer surface of the annular body which extend in the direction of movement of the tubular casing, i.e. parallel to the longitudinal axis of the stuffing horn, have the form of grooves, furrows or indentations which have a substantially U-formed, V-formed or rectangular cross-sectional and end view configuration. The recesses preferably extend over the entire length of the annular body. The outer surface of the annular body is adjacent the recesses, and the greatest outer circumference of the annular body is smaller than the inner circumference of the tubular casing in the deshirred state.

The tubular casing is pressed into the recesses by the braking and smoothing elements, which preferably have the same cross-sectional configuration as the recesses in the annular body, whereby the casing may be stretched as much as desired, depending on the depth of the recesses. In an extreme case, the braking elements press the casing against the bottoms of the recesses in the annular body.

The braking elements may have a circular cross-sectional configuration. Desirably, the braking and smoothing elements and/or the annular body are displaceable relative to each other along an axis spaced from and extending parallel to the longitudinal axis of the stuffing horn. The braking elements are preferably rod-shaped, whereby one end thereof which extends in a direction opposite to the direction of movement of the tubular casing is sloped or beveled, i.e. cut away at an angle, facing the stuffing horn in the direction of the movement of the tube. Advantageously, the other end of each braking and smoothing element, which is located adjacent the stuffing horn outlet, is secured to a plate which is arranged perpendicular to the longitudinal axis of the stuffing horn and is displaceable parallel to this longitudinal axis. The plate may be fastened at its margin, for example, to a suitable support. By displacing the plate parallel to the longitudinal axis of the stuffing horn in a direction opposite to the direction of movement of the tube and/or by displacing the annular body parallel to the longitudinal axis of the stuffing horn in the direction of movement of the tube, the beveled ends of the braking and smoothing elements are extended into the recesses of the annular body, whereby the tubular casing is pressed into the recesses. Further, the plate must have a central opening through which the stuffing horn and the tubular casing extend.

In one preferred embodiment, the displaceable annular body may be fastened to an outer tube which is longitudinally displaceable with respect to the stuffing horn, and the braking and smoothing elements may have a fixed location.

In a further embodiment of the invention, the annular body has a fixed location, and the braking and smoothing elements are movable and are pressed into the recesses in a direction perpendicular to the longitudinal axis of the stuffing horn.

In a particularly preferred embodiment, the surfaces at the deepest point of the recesses in the annular body slope outwardly or decrease in depth an amount corresponding to the beveling of the ends of the braking and smoothing elements.

Following the annular body, the tubular casing is constricted directly adjacent the stuffing horn outlet by means of a ring so that the sausage material which comes out of the stuffing horn outlet cannot flow back toward the annular body. Known devices for closing or tying off the tubular casing, such as clipping devices, and a cutting station for severing the filled and closed sections of the tube follow after the constricting ring.

At the beginning of the stuffing operation, the unshirred end of the shirred tubular casing is initially drawn over the annular body and closed in the clipping device. In order to facilitate the positioning of the shirred tubular casing on the stuffing horn, the braking and smoothing elements are either displaced longitudinally with respect to the stuffing horn outlet or, if they are fastened to a plate which is formed in separable segments, the plate segments may be moved or pivoted away from the stuffing horn.

As a result of the pressure with which the paste-like stuffing mass, such as a sausage mixture, is forced through the stuffing horn into the unshirred portion of the tubular casing, the tubular casing is continuously drawn over the outer surface of the annular body and is thereby simultaneously deshirred and smoothed. Because of the frictional forces generated by the mutual contact of the external braking and smoothing elements and the casing as well as the annular body and the casing, the withdrawal of the tubular casing is braked or restrained. The braking action is regulated by the extent of spreading or stretching of the tube. The braking action depends on the amount of pressure between the braking and smoothing elements and the tube which may be adjusted, for example, by longitudinal displacement of the braking elements. Usually, the speed of tube withdrawal will lie in the range from 10 to 20 meters per minute.

After the tube is completely stuffed, the braking and smoothing elements are again moved away from the recesses in the annular body, for example by longitudinal displacement toward the stuffing horn outlet, and the next shirred tube can be placed on the stuffing horn. The displacement of the braking and smoothing elements, or the annular body, may be effected manually or by means of mechanical or pneumatic devices.

Turning now to the drawings, the apparatus of FIG. 1 comprises a stuffing horn 1 of a stuffing machine. A fluid mass 2 flows under pressure out of the stuffing horn outlet 8 into the deshirred portion 3 of the tubular casing. The shirred portion 4 of the tubular casing is disposed on an outer tube 5 which is releasably and displaceably fastened to the outer surface of the stuffing horn 1. The annular body 6 with groove-shaped recesses 7 on its outer surface is connected to the outer tube 5 by a bayonet lock 9. The smoothing elements 10 have one end fastened to a plate 11 while the other end has a beveled or sloping cutaway surface 12.

A device which has the form of a ring 13 is attached directly adjacent the stuffing horn outlet 8 and prevents backflow of the fluid mass 2 in a direction opposite the direction of movement of the tubular casing along the outer surface of the stuffing horn by constricting the tubular casing 3.

Devices for closing the tubular casing, for example clipping devices 14, and a cutting station 15 for severing filled sections of the tube follow after the stuffing horn 1 and are illustrated only schematically.

Figure 2:
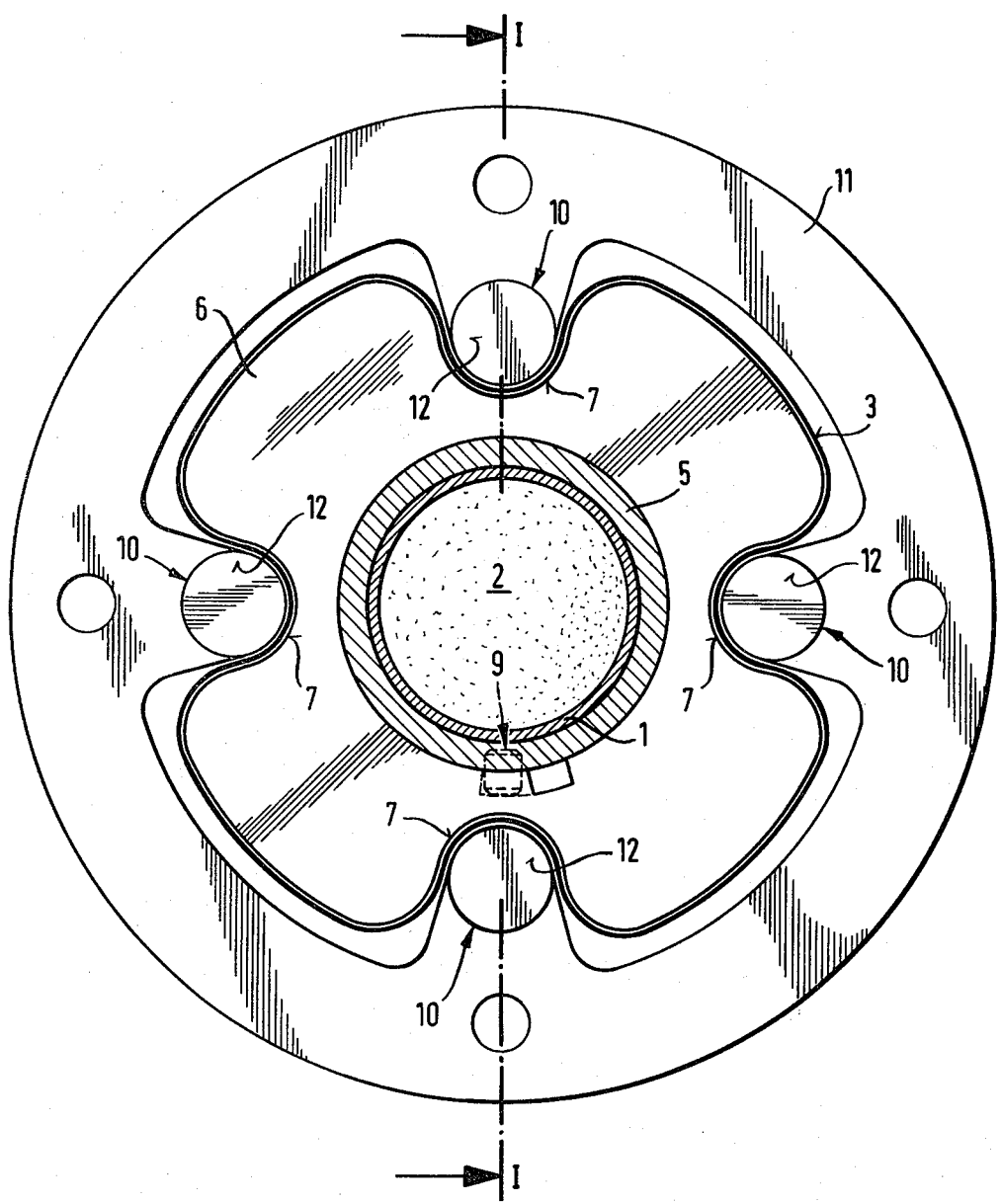
FIG. 2 is a sectional end view of the apparatus of FIG. 1 taken along line II—II of FIG. 1.
Figure 3:
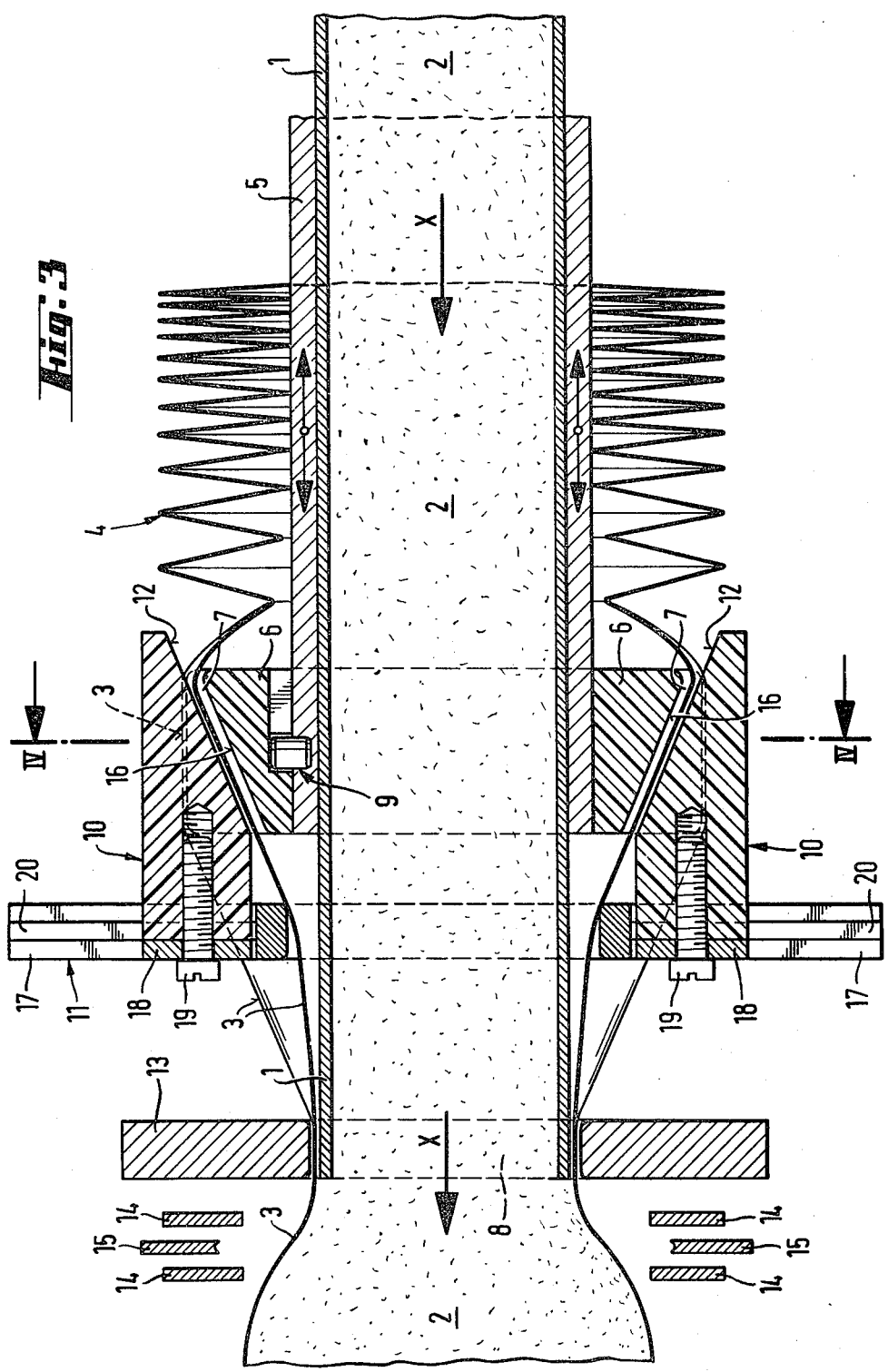
FIG. 3 is a longitudinal sectional view of an apparatus equipped with a further embodiment of the invention taken along line III—III of FIG. 4.
Figure 4:
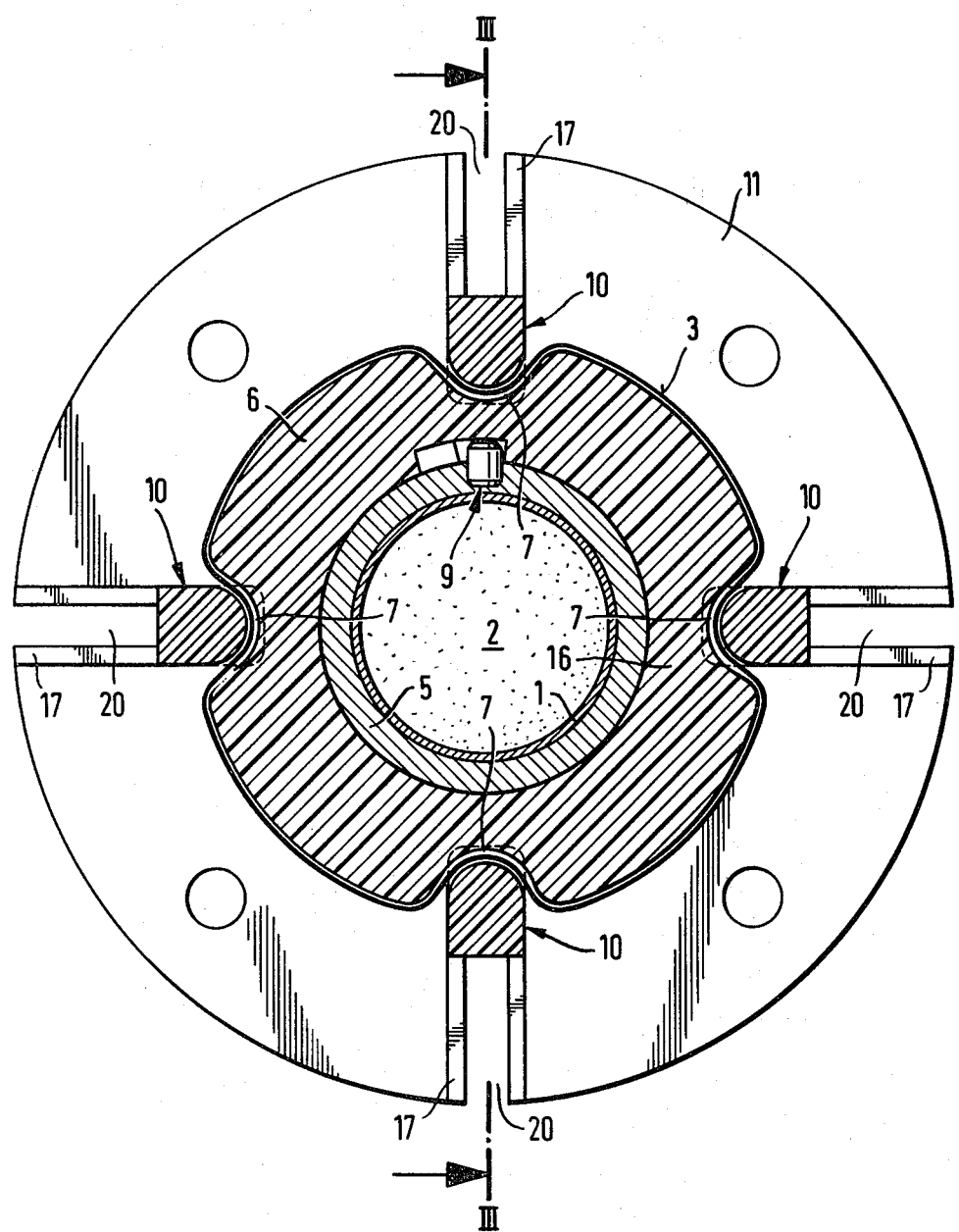
FIG. 4 is a sectional end view of the apparatus of FIG. 3 taken along line IV—IV of FIG. 3.

In contrast to the device illustrated in FIGS. 1 and 2, the recesses 7 in the annular body 6 in the embodiment illustrated in FIGS. 3 and 4 have a bottom surface 16 which slopes outwardly in a direction opposite to the direction of movement of the tube, indicated by arrow X, and extends parallel to the beveled or cutaway surface 12 of braking and smoothing elements 10. The other end of smoothing elements 10 is mounted in a slot 20 and held by two guide rails 17 so that its position perpendicular to the longitudinal axis of the stuffing horn can be varied. Each braking and smoothing element 10 is attached to plate 11 by means of a support plate 18 and a screw 19.

It is also possible within the scope of the invention to package the annular body 6 together with a shirred tubular casing prior to use with the annular body disposed in an unshirred end of the tubular casing as shown in U.S. Pat. No. 4,007,761.

The foregoing description has been set forth merely to illustrate the invention and is not intended to be limiting. Since modifications of the disclosed embodiments incorporating the spirit and substance of the invention may occur to persons skilled in the art, the scope of the invention is to be limited solely with respect to the appended claims and equivalents.

We claim:

1. A device for deshirring, smoothing and braking a shirred tubular casing into which a fluid mass flows under pressure from a stuffing horn of a stuffing machine, said device comprising an annular body having a central opening releasably securable to a stuffing horn, said annular body having recesses on its outer surface extending parallel to its longitudinal axis, said device further comprising elements for smoothing and braking the tubular casing, said elements having a configuration substantially corresponding to the configuration of said recesses, said elements and said annular body being displaceable relative to each other such that said elements may be moved between a position in which the elements are spaced from said recesses and a position in which said elements are at least partially extended into said recesses.

2. A device according to claim 1, wherein said recesses have a cross-sectional configuration selected from the group consisting of substantially U-shaped, substantially V-shaped and rectangular.

3. A device according to claim 1, wherein said annular body and said braking elements are displaceable relative to each other along a axis parallel to the longitudinal axis of said annular body.

4. A device according to claim 1, wherein said braking elements are displaceable perpendicular to the longitudinal axis of said annular body into and out of said recesses.

5. Apparatus for stuffing a fluid mass into a shirred tubular casing which is deshirred prior to stuffing, said apparatus comprising a stuffing horn of a stuffing machine having an outlet through which a fluid mass flows under pressure, a shirred tubular casing disposed around the outer surface of the stuffing horn and having an unshirred portion with a prescribed inner diameter, an annular body with a central opening releasably secured to the outer surface of the stuffing horn adjacent the stuffing horn outlet and having recesses extending in the direction of movement of the tubular casing on its outer surface, the inner surface of the unshirred portion of the tubular casing lying directly adjacent the outer surface of said annular body at least in the regions adjacent the recesses; the outer diameter of said annular body being smaller than the inner diameter of the unshirred portion of the tubular casing; said apparatus further comprising elements for smoothing and braking the tubular casing having a configuration substantially corresponding to the configuration of the recesses, said elements lying immediately adjacent the outer surface of the unshirred portion of the tubular casing and pressing the tubular casing into said recesses; said elements and said annular body being displaceable relative to each other such that said elements may be moved between a position in which the elements are spaced from said recesses and a position in which said elements are at least partially extended into said recesses.

6. An apparatus according to claim 5, wherein said braking elements are rod-shaped and one end of said elements oriented opposite the direction of movement of the casing is beveled facing the stuffing horn in the direction of movement of the tubular casing.

7. An apparatus according to claim 6, wherein the other end of the braking elements adjacent the stuffing horn outlet is fastened to a plate which is arranged displaceable parallel to the longitudinal axis of the stuffing horn.

8. An apparatus according to claim 7, wherein said braking elements are displaceably fastened to said plate for movement perpendicular to the longitudinal axis of the stuffing horn.

9. An apparatus according to claim 6, wherein the recesses in the annular body have surfaces at their deepest points which slope outwardly in the direction opposite to the direction of movement of said tubular casing.

10. An apparatus according to claim 5, further comprising means for preventing the fluid mass from the stuffing horn outlet from flowing back in a direction opposite the direction of movement of the tubular casing.

11. An apparatus according to claim 10, wherein said backflow-preventing means comprises a ring adjacent the stuffing horn outlet which constricts the deshirred portion of the tubular casing.

12. An apparatus according to claim 5, further comprising means for closing the stuffed casing and means for severing the stuffed and closed casing.

13. An apparatus according to claim 5, wherein the outer periphery of said annular body has a circular cross-sectional configuration with recesses.

14. An apparatus according to claim 5, wherein said annular body has a polygonal cross-sectional configuration with the recesses at the corners.

* * * * *